(12) United States Patent
Gaille et al.

(10) Patent No.: US 9,821,963 B2
(45) Date of Patent: Nov. 21, 2017

(54) DEVICE AND METHOD FOR INFEEDING PRODUCTS

(71) Applicant: Robert Bosch GmbH, Stuttgart (DE)

(72) Inventors: Fabrice Gaille, Lausanne (CH); A Christian Vouillamoz, Fully (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/234,088

(22) Filed: Aug. 11, 2016

(65) Prior Publication Data

US 2017/0043957 A1  Feb. 16, 2017

(30) Foreign Application Priority Data

Aug. 12, 2015 (DE) .................. 10 2015 215 366

(51) Int. Cl.
| | |
|---|---|
| *B65G 47/34* | (2006.01) |
| *B65G 47/256* | (2006.01) |
| *B65G 21/20* | (2006.01) |
| *B65G 47/52* | (2006.01) |
| *B65G 43/08* | (2006.01) |
| *B65G 47/08* | (2006.01) |

(52) U.S. Cl.
CPC ......... *B65G 47/34* (2013.01); *B65G 21/2072* (2013.01); *B65G 43/08* (2013.01); *B65G 47/086* (2013.01); *B65G 47/256* (2013.01); *B65G 47/525* (2013.01); *B65G 2203/042* (2013.01); *B65G 2207/40* (2013.01)

(58) Field of Classification Search
CPC .............................. B65G 47/256; B65G 47/34
See application file for complete search history.

(56) References Cited

U.S. PATENT DOCUMENTS

| | | | | |
|---|---|---|---|---|
| 3,109,529 | A | 11/1963 | Carter | |
| 3,731,783 | A * | 5/1973 | Dreher | B07C 5/02 198/398 |
| 4,678,073 | A | 7/1987 | Anderson et al. | |
| 5,064,049 | A * | 11/1991 | Saito | B65G 47/256 198/399 |
| 6,152,289 | A * | 11/2000 | Wark | B65G 47/525 198/370.11 |
| 6,789,661 | B2 * | 9/2004 | Davies | B65G 47/1421 198/391 |
| 6,884,016 | B2 * | 4/2005 | Ogle | B65B 5/08 193/44 |
| 7,159,375 | B2 * | 1/2007 | Hellmann | B65B 35/44 53/155 |

(Continued)

FOREIGN PATENT DOCUMENTS

| | | |
|---|---|---|
| CH | 488593 | 4/1970 |
| JP | 2001002232 A | 1/2001 |

(Continued)

*Primary Examiner* — Thomas Randazzo
(74) *Attorney, Agent, or Firm* — Michael Best & Friedrich LLP

(57) ABSTRACT

A device and a method for infeeding products (10), wherein the device comprises at least one infeed (12) which infeeds products (10) to a transportation system (20), and comprises at least one sensor (28) for identifying products (10) which are backed up, wherein at least one ejection means (14, 16) for removing at least one product (10) which is located and backed up on the infeed (12) is provided.

24 Claims, 3 Drawing Sheets

(56) References Cited

U.S. PATENT DOCUMENTS

| | | | | |
|---|---|---|---|---|
| 8,490,797 | B2* | 7/2013 | Tanner | B29C 49/4205 |
| | | | | 198/389 |
| 8,522,956 | B2* | 9/2013 | Tanner | B29C 49/4205 |
| | | | | 198/395 |
| 8,640,852 | B2* | 2/2014 | Seki | B07C 5/34 |
| | | | | 198/380 |
| 9,533,833 | B2* | 1/2017 | Seitel | B65G 43/08 |
| 2003/0080139 | A1* | 5/2003 | Davies | B23P 19/004 |
| | | | | 221/156 |
| 2003/0105550 | A1 | 6/2003 | Ouellette | |
| 2010/0037557 | A1* | 2/2010 | Wilhelm | B65B 7/2807 |
| | | | | 53/331.5 |
| 2015/0041282 | A1* | 2/2015 | Seitel | B65G 43/08 |
| | | | | 198/401 |

FOREIGN PATENT DOCUMENTS

| | | | |
|---|---|---|---|
| JP | 3255215 | B2 | 2/2002 |
| JP | 2010202341 | A | 9/2010 |

\* cited by examiner

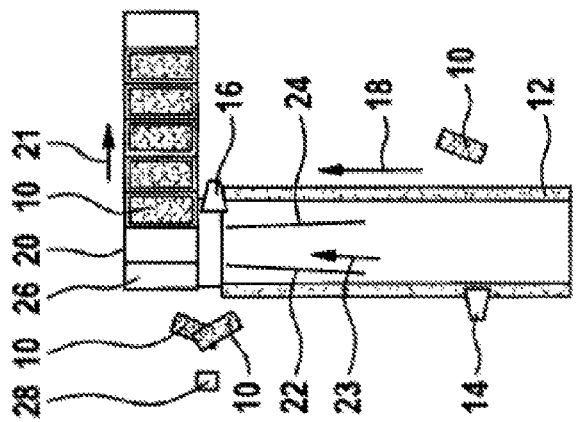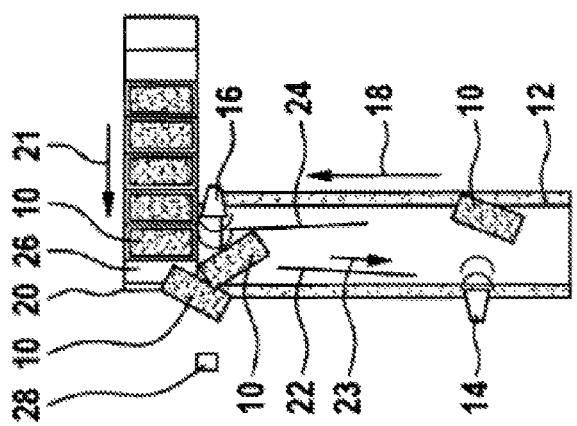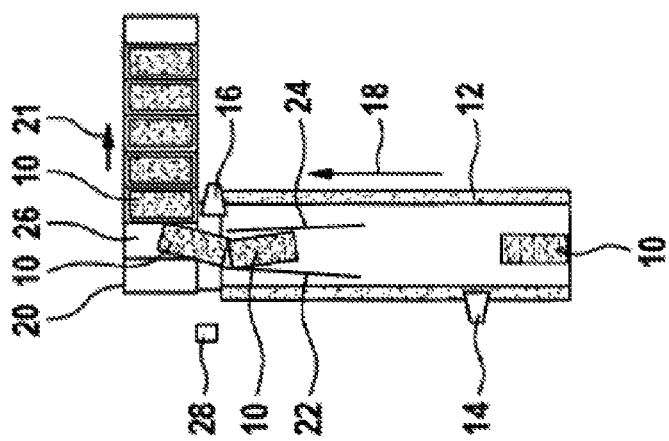

DEVICE AND METHOD FOR INFEEDING PRODUCTS

BACKGROUND OF THE INVENTION

The invention relates to a device and to a method for infeeding products.

A device for infeeding packs to a packaging machine is already known from DE 372110 15 1. For avoiding manual placing, the packs herein with the aid of a slide are automatically pushed out of a magazine in a transverse direction onto a conveyor belt and infed to a packaging machine. A light barrier, with the aid of which backing up which arises in this region may be identified, is disposed on a second conveyor belt, in the region of deflection of the packs. On account thereof the device may be immediately switched off.

SUMMARY OF THE INVENTION

As opposed to the above, the device and the method according to the invention have the advantage that a potential back up of products may be automatically resolved. Manual interventions by the user are therefore no longer necessary. A back up of products may moreover be more rapidly resolved. This is made possible in that at least one ejection means for removing at least one product which is located and backed up on the infeed is provided.

It is provided in one expedient refinement that the ejection means is disposed between the infeed and the transportation system. It is specifically in this region that products are often backed up, corresponding removal thus being enabled in a reliable manner.

In one expedient refinement, at least one nozzle, preferably an air-stream generating nozzle, is used as the ejection means. Said nozzle is distinguished by simple handling and reliable removal of the products which are backed up.

In one expedient refinement, at least one further ejection means which is disposed remote from the first ejection means is provided in order to preclude infeeding of further products. On account thereof, it is reliably avoided that further inflowing products enlarge any backing up of products. On account thereof, the infeed may furthermore be preferably continuously moved without the usual production process being interfered with.

In one expedient refinement, for removing at least one backed up product the transportation system is actuated to an operating mode which deviates from the normal operating mode, in particular so as to be counter to the usual transportation direction. It is specifically by way of an opposite movement that lateral edges of possible compartments of the transportation system may remove backed up products from the transfer region, or may contribute towards their removal.

It is provided in one expedient refinement that at least one ejection means is disposed such that at least one backed up product may be expelled counter to the transportation direction of the transportation means in the normal operating mode. Such an arrangement is specifically advantageous since the transportation means, deviating from the usual transportation direction, may support this ejection movement.

In one expedient refinement, at least one lateral guide for guiding at least one product which is located on the infeed is provided. The at least one lateral guide is preferably configured so as to be movable. On account thereof, products may be infed to the transportation system in an accurately positioned manner. On the other hand, it may be achieved by way of the movable arrangement of the lateral guide that products which are backed up may also be reliably discharged in the region of the lateral guide. This contributes towards a safe and reliable resolution of the backing up of products.

BRIEF DESCRIPTION OF THE DRAWINGS

One exemplary embodiment of the device according to the invention is illustrated in the drawing and will be described in more detail hereunder. In the drawing:

FIG. 1 shows a plan view of the device in an as yet not backed up state;

FIG. 2 shows a plan view of the device according to FIG. 1, when countermeasures are initiated in order for the backing up of products to be dissolved;

FIG. 3 shows a plan view of the device according to FIGS. 1 and 2, after the backing up of products has been removed;

DETAILED DESCRIPTION

Figure 4:
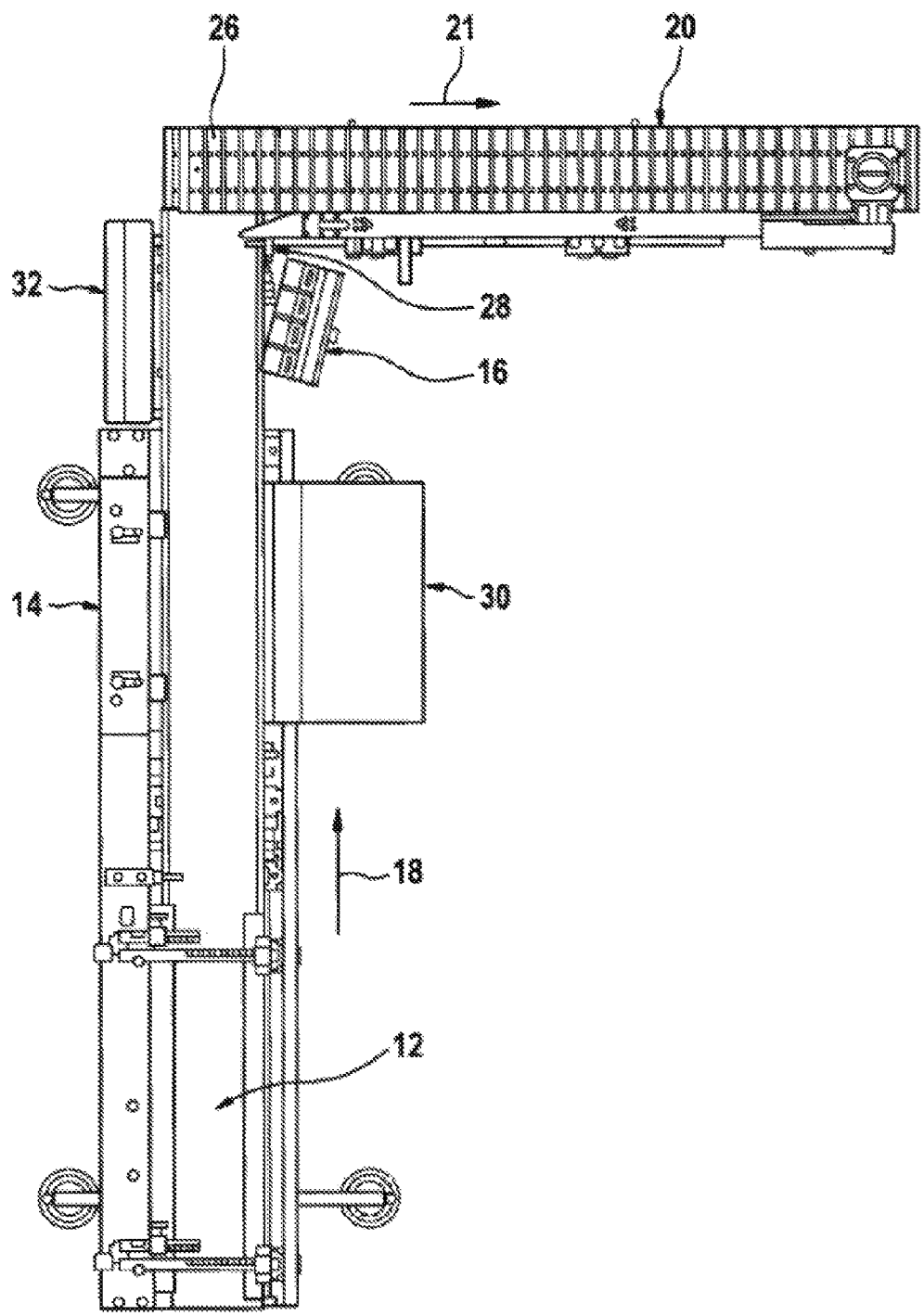
FIG. 4 shows a plan view of a further exemplary embodiment without lateral guides.

An infeed 12 in the infeeding direction 18 infeeds products 10 to a transportation system 20. To this end, the transportation system 20 has corresponding compartments 26 for receiving a respective product 10. The transportation system 20 moves in a transportation direction 21 which in the exemplary embodiment is oriented so as to be perpendicular to the infeeding direction 18 of the infeed 12. A first ejection means 14 is disposed laterally on the infeed 12. The ejection means 14 is preferably disposed at a point of the infeed 12 that is remote from the interface with the transportation system 20. The infeed 12 at this point is configured such that the ejection means 14 when activated may move a product 10 which is located in the region of acquisition of said ejection means 14 laterally from the infeed 12 such that said product 10 leaves the infeed 12 and is no longer infed to the transportation system 20. The ejection means 14 thus causes no further products 10 to be moved towards the transportation system 20, or towards the transfer region, respectively. The infeed 12 and the transportation system 20 are preferably disposed so as to be mutually perpendicular.

A (further) ejection means 16 is preferably disposed at the end of the infeed 12, in the direction of the transfer region to the transportation means 20. The further ejection means 16 is preferably located at such a point where backing up of products may arise, in particular in the transfer region between the infeed 12 and the transportation system 20.

The two ejection means 14, 16 may be actuated in a mutually independent manner. It is achieved on account thereof that the backed up region is freed up precisely according to requirement, on the one hand, while the ejection means 14 ensures that no new product 10 is infed to the backed up region. Moreover, the infeed 12 may be continuously operated even once a backing up of products has been identified.

A sensor 28 which by means of, for example, optical or capacitive or other systems, identifies the presence of a backing up of products is also disposed in this transfer region or region prone to backing up of products, respectively. To this end, the sensor 28 could be disposed in a suitable manner laterally to or above the transfer region.

Lateral guides 22, 24 are provided in order for the products 10 which potentially may be positioned in various manners to be placed in a defined transfer position so as to be transferred to the transportation system 20. Said lateral guides 22, 24, however, are not mandatory, or may only be embodied in the form of a single lateral guide 22. The lateral guides 22, 24 are preferably disposed so as to converge or to be funnel-shaped. At least one lateral guide 22 is configured so as to be movable. The capability of movement of the lateral guide 22 in this way serves in particular for laterally removing backed up products 10 from the infeed 12 by the ejection means 16. A retracted lateral guide 22 enables the product 10 to be ejected by the ejection means 16. Preferably, that lateral guide 22, 24 that is disposed on that side of the infeed 12 that is opposite the ejection means 16 is disposed so as to be at least movable.

The transportation system 20 is intended to be filled with products 10 by way of the infeed 12. The transportation system 20 infeeds the products 10 which are located in a regular manner in the compartments 21 to further processing steps, such as to a packaging machine, for example, or similar. The transportation system 20 may be configured as a belt conveyor, for example. The transportation system 20 may be moved in the movement direction 21 by way of drives (not illustrated), or else counter to the movement direction 21 which is usual in the normal operating mode.

The device described now operates as follows. In the normal operating mode, the infeed 12 infeeds products 10, after the latter have been aligned by the lateral guides 22, 24, to the compartments 21 of the transportation system 20 which are standing by, as is illustrated in an exemplary manner in FIG. 1.

In the situation as per FIG. 2, the sensor 28 detects a backing up of products. In this way, the products 10 may jam in the infeed region, for example, causing mutual blockage, or may prevent orderly filling of the compartments 21 in another manner. In the case of a backing up of products being identified, a controller (not shown) actuates at least one, preferably both ejection means 14, 16 and/or the transportation system 20 and/or the lateral guide 22. The first ejection means 14 is activated, on the one hand. In this way, products 10 which are possibly still being infed are removed from the infeed 12. The ejection means 14, 16 in an exemplary manner is configured as a nozzle which in the case of a backing up being identified is impinged with compressed air. The compressed-air pulse moves the product 10 laterally, or transversely to the infeeding direction 18, respectively, such that said product 10 falls from the infeed 12.

The controller actuates the lateral guide 22 such that the latter is retracted, counter to the usual infeeding direction 18 of the infeed 12. On account thereof, products 10 which are located in the region of the lateral guides 22, 24 may be moved by the ejection means 16 laterally beyond the periphery of the infeed 12 such that the products 10 which are backed up may fall from the infeed 12, preferably into containers (not shown).

The further ejection means 16 could also be configured as a nozzle which is preferably impinged with compressed air. In parallel with the reverse movement of the transportation system 20, the ejection means 16 by impinging the products 10 with a compressed-air pulse also conveys the latter out of the crossing region. The retracted lateral guide 22 does not impede ejection of the products 10 which are backing up. The products 10 which are backed up are completely removed from the crossing region, or from the infeed 12, respectively.

In parallel herewith, the transportation system 20 is moved counter to the transportation direction 21 which is usual in the normal operating mode. On account thereof, an edge of the compartment 26 also pushes a backed up product 10 in the ejection direction. In the case of this actuation of the transportation system 20, the latter also serves as the ejection means.

The device subsequently is activated in the normal operating mode again. In this way, the lateral guide 22 is converted back to the normal state, that is to say so as to be disposed parallel with the other lateral guide 24 which is not moved. The transportation system 20 by way of the next vacant compartment 26 is displaced to the transfer position, so as to stand by for receiving the next product 10.

The infeed 12 may likewise be configured as a preferably revolving conveyor belt. Alternative design embodiments are possible.

Other mechanical systems such as grippers, slides, or similar, may also be employed as ejection means 14, 16. Said other mechanical systems must be suitable for removing the products 10 from the backed up region in the case of backing up being detected, on the one hand. On the other hand, said other mechanical systems are also to preclude infeeding of further products 10 until the products 10 which are backed up have been removed. As has been described, the transportation system 20 may also be employed as an ejection means in that the former exerts a targeted mechanical movement on the products 10 such that the latter leave the backed up region.

In this way, the lateral guide(s) as per 22, 24 is/are not mandatory. However, should said lateral guides be present it must be ensured that the former by way of suitable capability of movement do not impede removal of products 10 which are backed up.

Figure 5:
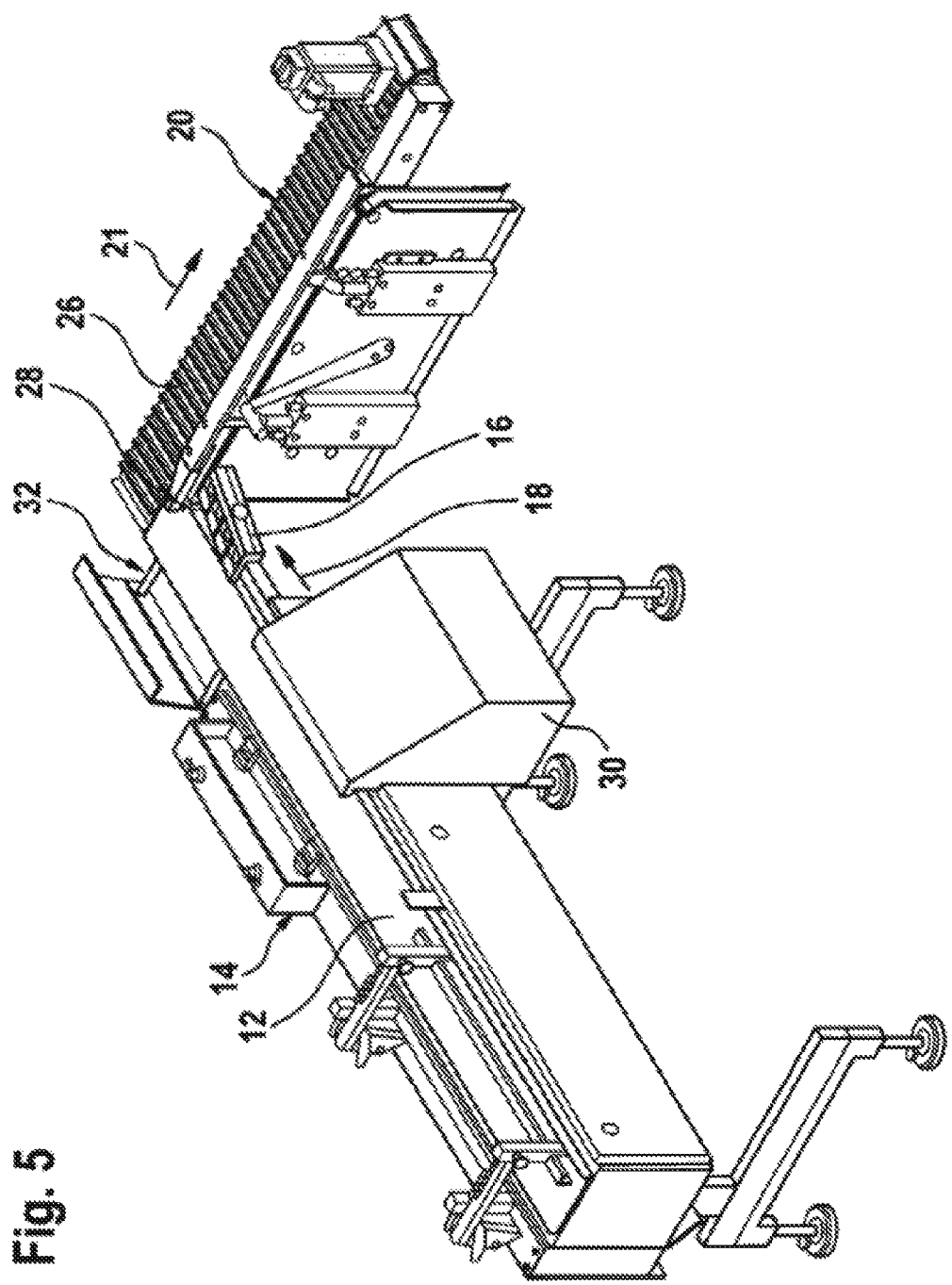
FIG. 5 shows a perspective illustration of the device as per FIG. 4.

A corresponding exemplary embodiment without lateral guides is shown in FIGS. 4 and 5. The functional mode corresponds substantially to that of FIGS. 1 to 3. Additionally, however, a container 30 into which the products 10 which are expelled by the ejection means 14 from the infeed 12 make their way and in which they are collected is provided on the opposite side of the first ejection means 14 (the infeed 12 being disposed therebetween). The container 30 is directly contiguous to the side of the infeed 12 such that the products 10 may be removed as simply as possible from the infeed 12.

A further container 32 in which the products 10 which are removed from the infeed 12 by the further ejection means 16 are collected is also disposed on the opposite side of the further ejection means 16 (the infeed 12 being disposed therebetween).

If and when the sensor 28 detects products backing up in the transfer region between the infeed 12 and the transportation system 20, the ejection means 14 is activated, on the one hand. This ensures that the inflowing products 10 are placed in the container 30 lying opposite thereto. On account thereof, no new products 10 make their way into the backed up transfer region. In parallel therewith, the further ejection means 16 is activated. Said further ejection means 16 conveys products 10 backing up into the opposite container 32. Particularly preferably, the infeed 12 runs on continuously. On account thereof, the usual procedure is not interrupted. Only products 10 backing up and products 10 which are infed while the back up is being resolved make their way into the further container 30, 32. Said products 10 may subsequently be infed back to the usual production process.

Optionally, the transportation system 20 could also be actuated to the opposite transportation direction 21. On account thereof, products 10 which are located in the region of the compartment 26 are moved in the direction towards the container 32 and/or into the acquisition region of the further ejection means 16. However, this is not mandatorily required.

The method for infeeding products 10 is distinguished by the following steps. The sensor 28, for identifying a backing up of products, monitors at least the transfer region. If and when a backing up of products is identified, a controller (not shown) activates the ejection means 14 and/or the ejection means 16. Optionally, the transportation system 20 is actuated counter to the transportation direction 21. The transportation system 20 is subsequently displaced to a position in which the compartment 26 which is next to be filled is located in the acquisition region of the infeed 12. If and when the sensor 28 identifies that there is no backing up of products which blocks the infeed region, the ejection means 14, 16 are deactivated again. The continuously moving infeed 12 now again infeeds products 10 to the transportation system 20, or to the next vacant compartment 26. After the compartments 26 have been filled, the cycle of the transportation system 20 continues.

The device is a component part of an infeed for various transportation applications, in particular in the packaging field of pharmaceuticals or foodstuffs, for example. However, the use thereof is not restricted thereto.

What is claimed is:

1. An infeed device comprising:
   at least one infeed (12) which infeeds products (10) to at least one transportation system (20),
   at least one sensor (28) for identifying products (10) which are backed up, and
   at least one ejection means (14, 16) for removing at least one product (10) which is identified and backed up on the infeed (12),
   wherein the infeed (12) includes a conveyor that remains activated and moving while the at least one ejection means (14, 16) is active.

2. The device according to claim 1, characterized in that the ejection means (14, 16) is disposed between the infeed (12) and the transportation system (20).

3. The device according to claim 1, characterized in that the ejection means includes at least one nozzle.

4. The device according to claim 1, characterized in that the ejection means (14, 16) in relation to the infeed (12) is disposed such that the product (10) is removed from the infeed (12) in a manner substantially transverse to a transportation direction (18) of the infeed.

5. The device according to claim 1, characterized in that at least one further ejection means (14, 16), which is disposed remote from the at least one ejection means (14, 16), is provided in order to preclude infeeding of further products (10).

6. The device according to claim 1, further comprising at least one container (30, 32) for receiving the at least the product (10) which is removed by the ejection means (14, 16) from the infeed (12).

7. The device according to claim 1, characterized in that for removing at least one backed up product (10), the transportation system (20) is actuated to an operating mode which deviates from a normal operating mode.

8. The device according to claim 1, characterized in that the ejection means (16) is disposed such that at least one backed up product (10) may be expelled counter to a transportation direction (21) of the transportation means (20) in the normal operating mode.

9. The device according to claim 1, further comprising at least one lateral guide (22, 24) for guiding at least one product (10) which is located on the infeed (12).

10. The device according to claim 1, characterized in that the ejection means includes an air-stream generating nozzle.

11. The device according to claim 1, characterized in that for removing at least one backed up product (10) the transportation system (20) is actuated to an operating mode which deviates from a normal operating mode, so as to be counter to a usual transportation direction (21).

12. The device according to claim 1, characterized in that after removal of at least one product (10) from the infeed (12), at least one lateral guide (22) is configured to be moved back to a normal position.

13. The device according to claim 1, characterized in that at least one lateral guide (22) is movable.

14. The device according to claim 13, wherein the at least one lateral guide (22, 24) is movable from a first position along the at least one infeed (12) to a second, retracted position along the at least one infeed (12), such that the at least one ejection means (16) may eject the at least one product (10) from the at least one infeed (12) when the at least one lateral guide has been moved to the second position.

15. A method for infeeding products (10), comprising:
    infeeding products (10) with an infeed (12) to at least one transportation system (20),
    identifying backed up products (10) with a sensor (28), and
    removing, with at least one ejection means (14, 16), at least one product (10) which is identified and backed up on the infeed (12),
    wherein the infeed (12) includes a conveyor that remains activated and moving while the at least one ejection means (14, 16) is active.

16. The method according to claim 15, characterized in that a further ejection means (14, 16) removes at least one incoming product (10) from the infeed (12).

17. The method according to claim 15, characterized in that for ejecting a product (10), the transportation system (20) is actuated to an operating mode which deviates from a normal operating mode.

18. The method according to claim 15, characterized in that a lateral guide (22, 24) is moved from a first position along the at least one infeed (12) to a second, retracted position along the at least one infeed (12), such that the at least one ejection means (16) may eject the at least one product (10) from the at least one infeed (12) when the lateral guide (22, 24) has been moved to the second position.

19. The method according to claim 15, characterized in that the transportation system (20) is displaced in an opposite direction.

20. The method according to claim 15, characterized in that the ejection means (14, 16) removes at least one product (10) which is located between the infeed (12) and the transportation system (20) from the infeed (12).

21. An infeed device comprising:
    at least one infeed (12) which infeeds products (10) to at least one transportation system (20),
    at least one sensor (28) for identifying products (10) which are backed up,
    at least one ejection means (14, 16) for removing at least one product (10) which is identified and backed up on the infeed (12), and
    at least one movable lateral guide (22, 24) that is movable from a first position along the at least one infeed (12) to a second, retracted position along the at least one infeed (12), such that the at least one ejection means (16) may eject the at least one product (10) from the at least one infeed (12) when the at least one lateral guide has been moved to the second position.

22. An infeed device comprising:
at least one infeed (12) which infeeds products (10) to at least one transportation system (20),
at least one sensor (28) for identifying products (10) which are backed up,
at least one first ejection means (14, 16) for removing at least one product (10) which is identified and backed up on the infeed (12), and
at least one further, second ejection means (14, 16) which is disposed remote from the at least one first ejection means (14, 16), wherein the second ejection means (14, 16) is provided in order to preclude infeeding of further products (10).

23. An infeed device comprising:
at least one infeed (12) which infeeds products (10) to at least one transportation system (20),
at least one sensor (28) for identifying products (10) which are backed up, and
at least one ejection means (14, 16) for removing at least one product (10) which is identified and backed up on the infeed (12),
wherein for removing at least one backed up product (10), the at least one transportation system (20) is actuated to an operating mode which deviates from a normal operating mode.

24. The infeed device of claim 23, wherein the at least one transportation system (20) moves in a transportation direction (21) to move the products (10) during the normal operating mode, and wherein to remove the at least one backed up product (10) in the operating mode, the at least one transportation system (20) moves in a direction opposite the transportation direction (21).

\* \* \* \* \*